(12) United States Patent
Kawamura et al.

(10) Patent No.: US 6,769,072 B1
(45) Date of Patent: Jul. 27, 2004

(54) DISTRIBUTED PROCESSING SYSTEM WITH REGISTERED RECONFIGURATION PROCESSORS AND REGISTERED NOTIFIED PROCESSORS

(75) Inventors: Kengo Kawamura, Kawasaki (JP); Takayuki Kishida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 650 days.

(21) Appl. No.: 09/607,175

(22) Filed: Jun. 29, 2000

(30) Foreign Application Priority Data

Sep. 14, 1999 (JP) .......................................... 11-260336

(51) Int. Cl.[7] .............................................. G06F 11/00
(52) U.S. Cl. .......................................... 714/5; 714/31
(58) Field of Search ............................ 714/5, 7, 31, 44, 714/47, 48

(56) References Cited

U.S. PATENT DOCUMENTS

| | | | | |
|---|---|---|---|---|
| 3,794,973 A | * | 2/1974 | Huber et al. ................... | 714/31 |
| 4,710,926 A | * | 12/1987 | Brown et al. ................... | 714/4 |
| 5,758,103 A | * | 5/1998 | Oh ............................... | 710/302 |
| 5,922,077 A | * | 7/1999 | Espy et al. ..................... | 714/7 |
| 5,974,114 A | * | 10/1999 | Blum et al. ..................... | 379/9 |
| 5,978,813 A | | 11/1999 | Foltz et al. | |
| 6,067,634 A | * | 5/2000 | Nelson ........................... | 714/4 |
| 6,298,039 B1 | * | 10/2001 | Buskens et al. ................ | 370/216 |
| 6,408,343 B1 | * | 6/2002 | Erickson et al. ............... | 710/15 |

FOREIGN PATENT DOCUMENTS

JP      10111825      4/1998

* cited by examiner

Primary Examiner—Robert Beausoliel
Assistant Examiner—Gabriel Chu
(74) Attorney, Agent, or Firm—Katten Muchin Zavis Rosenman

(57) ABSTRACT

A distributed-processing equipment has a first storage means in which identifiers of first processors that reconfigures respective devices are registered in advance. When a second processor has detected an event for which one of the devices is reconfigured, the second processor notifies, of the event, a first processor indicated by an identifier that is registered in the first storage means as corresponding to the device. This distributed processing equipment can flexibly adapt to a variety of configurations at a low cost without changing the configuration greatly, whereby the performance and the reliability of an information processing system and a facility to which the invention is applied can be kept high in a stable manner.

32 Claims, 12 Drawing Sheets

PRIOR ART FIG. 12
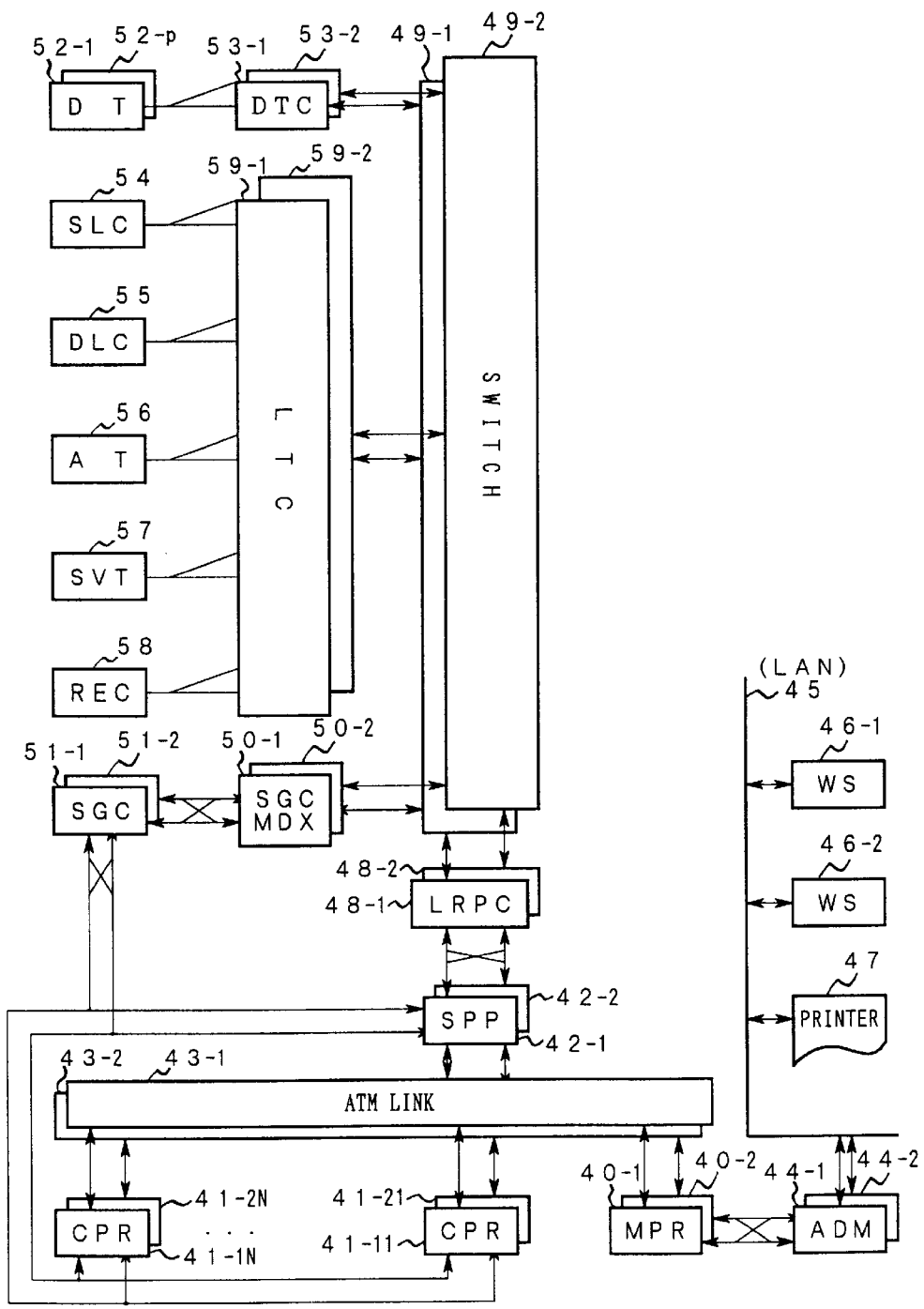

DISTRIBUTED PROCESSING SYSTEM WITH REGISTERED RECONFIGURATION PROCESSORS AND REGISTERED NOTIFIED PROCESSORS

BACKGROUND OF THE INVENTION

1. Field of the Invention

The present invention relates to a distributed-processing equipment having a processor that reconfigures redundant devices in accordance with their operating states and one or a plurality of processors that operate in link with those devices.

2. Description of the Related Art

In recent years, in many facilities such as exchanges that should operate continuously, functional distribution and load distribution are made by combining inexpensive microprocessors and high-level information processing technologies in an organic manner. Further, those facilities are configured as a distributed processing system which enables improvements in processing efficiency, response speed, reliability, and availability as well as can flexibly adapt to a sudden load variation and system expansion.

The hardware and software of such a facility is standardized in accordance with the forms of functional distribution and load distribution and are configured as a set of a variety of packages (modules) that conform to the standardization.

Each module employs a redundant structure that depends on the degree of influence of a failure or a fault occurring therein on other modules. If recovery from an actual failure or fault cannot be made by error correction or retrial, the module is reconfigured.

FIG. 12 shows an example of an exchange that is configured as a distributed processing system.

In FIG. 12, duplicated main processors (MPR) 40-1 and 40-2, duplicated call processors (CPR) 41-11 to 41-1N, and 41-21 to 41-2N that are provided according to a load distribution scheme, and duplicated signaling/path processors (SPP) 42-1 and 42-2 are connected to duplicated ATM links 43-1 and 43-2 via two sets of communication ports, respectively. The main processors 40-1 and 40-2 are connected to duplicated monitoring processors (ADM) 44-1 and 44-2 via duplicated communication links, and connected to one or a plurality of workstations (WS) 46-1 to 46-n and a printer 47 via a LAN 45 to which a CSMA/CD scheme is applied. The signaling/path processors 42-1 and 42-2 are connected to duplicated signaling/path controllers (LRPC) 48-1 and 48-2 via duplicated communication links, and particular communication ports of the signaling/path controllers (LRPC) 48-1 and 48-2 are connected to communication ports of duplicated switches (MSCSH) 49-1 and 49-2, respectively.

First ports of the ports of the switches 49-1 and 49-2 are connected to duplicated signaling multiplexing sections (SGCMDX) 50-1 and 50-2, respectively. Signaling controllers (SGC) 51-1 and 51-2 are connected to the signaling multiplexing sections 50-1 and 50-2 via duplicated links, respectively. Two communication ports of the respective signaling controllers 51-1 and 51-2 are connected to particular communication ports of the call processors 41-11 to 41-1N and 41-21 to 41-2N and the signaling/path processors 42-1 and 42-2 via duplicated communication links.

Second ports of the switches 49-1 and 49-2 are connected to digital terminal shelves (DTC) 53-1 and 53-2 that are mounted with a desired number p of digital terminals (DT) 52-1 to 52-p.

Third ports of the switches 49-1 and 49-2 are connected to line trunk shelves (LTC) 59-1 and 59-2 that are mounted, in a predetermined number and combination, with a line circuit (SLC) 54 that is connected to a subscriber line, a digital line circuit (DLC) 55 that is connected to a digital subscriber line, a switch-board interfacing part (AT) 56 that is connected to a switch-board (not shown), a service trunk (SVT) 57, and a register (REC) 58.

In the exchange having the above configuration, at a start or after reconfiguration (mentioned above), the signaling/path controllers 48-1 and 48-2 give predetermined instructions to the switches 49-1 and 49-2, whereby communication links (hereinafter referred to as "fixed communication links") are formed as fixed speech paths in the switches 49-1 and 49-2 so as to establish mesh-like connections between the signaling/path processors 42-1 and 42-2 and the signaling multiplexing sections 50-1 and 50-2, the digital terminal shelves 53-1 and 53-2, and the line trunk shelves 59-1 and 59-2.

The main processors 40-1 and 40-2, the call processors 41-11 to 41-1N and 41-21 to 41-2N, and the signaling/path processors 42-1 and 42-2 are connected to each other via netty channels that are formed as PVCs in the ATM links 43-1 and 43-2.

The signaling/path processors 42-1 and 42-2 are loose-coupled with the main processors 40-1 and 40-2 and the call processors 41-11 to 41-1N and 41-21 to 41-2N, via the above-mentioned fixed communication links and channels, to monitor the operating states of the duplicated monitoring processors 44-1 and 44-2, signaling/path controllers 48-1 and 48-2, switches 49-1 and 49-2, signaling multiplexing sections 50-1 and 50-2, signaling controllers 51-1 and 51-2, digital terminal shelves 53-1 and 53-2, and line trunk shelves 59-1 and 59-2.

When necessary, the signaling/path processors 42-1 and 42-2 dynamically reconfigure the above devices by supplying them with instructions that conform to results of the monitoring via the above-mentioned fixed communication links and channels.

Therefore, the main processors 40-1 and 40-2, the call processors 41-11 to 41-1N and 41-21 to 41-2N, the monitoring processors 44-1 and 44-2, the signaling/path controllers 48-1 and 48-2, the switches 49-1 and 49-2, the signaling multiplexing sections 50-1 and 50-2, the signaling controllers 51-1 and 51-2, the digital terminal shelves 53-1 and 53-2, and the line trunk shelves 59-1 and 59-2 operate with the above-mentioned duplication-type redundant structure and thereby maintain high functionality and performance of the exchange system.

The call processors 41-11 to 41-1N and 41-21 to 41-2N perform call processing according to a load distribution scheme.

During the course of this call processing, when necessary, the signaling/path processors 42-1 and 42-2 and the signaling/path controllers 48-1 and 48-2 relay and distribute messages to be passed to or from:

the call processors 41-11 to 41-1N and 41-21 to 41-2N; or
the switches 49-1 and 49-2, the signaling controllers 51-1 and 51-2, the digital terminal shelves 53-1 and 53-2, the line trunk shelves 59-1 and 59-2, the digital terminals 52-1 to 52-p, the line circuit 54, the digital line circuit 55, the switch-board interfacing part 56, the service trunk 57, and the register 58.

The main processors 40-1 and 40-2 collect information to be used for maintenance and operation of the individual sections by exchanging predetermined messages via the above-mentioned channels and fixed communication links.

The monitoring processors 44-1 and 44-2 perform man-machine interface relating to the maintenance and operation and support the maintenance and operation by cooperating, when necessary, with the workstations 46-1 to 46-n and the printer 47 that are connected to the main processors 40-1 and 40-2 via the LAN 45.

Processing to be performed in each section to realize the above-mentioned call processing, maintenance, and operation is not a characterizing feature of the invention and can be realized by using a variety of known techniques, and hence will not be described here.

Incidentally, among the above duplicated modules (packages), the signaling controllers 51-1 and 51-2, for example, exchange, via the above-mentioned channels and fixed communication links, predetermined register signals with one of the call processors 41-11 to 41-1N and 41-21 to 41-2N that has been selected under the above-described reconfiguration and load distribution during the course of call processing.

However, in a process that certain reconfiguration is performed under the control of the signaling/path processors 42-1 and 42-2, the signaling controllers 51-1 and 51-2 exchange predetermined messages with the signaling/path processors 42-1 and 42-2 via duplicated communication links.

During the course of such reconfiguration, not only the signaling controllers 51-1 and 51-2 but also the individual duplicated sections perform, when necessary, the following and other processing (hereinafter referred to simply as "device control") in accordance with a message that is given according to an individually applied redundancy scheme (active redundancy scheme or stand-by redundancy scheme):

Initialization.

Processing necessary for incorporation.

Transition to in-service state.

Transition to stand-by state.

Transition to out-of-service state.

Switching between an active facility and a stand-by facility.

Transition to a failure state.

Processing adapted to expansion.

The above-mentioned in-service state, out-of-service state, and the state that a transition from a stand-by facility (in-service state) to an active facility has completed are generically called "state-of-device."

Therefore, the signaling controllers 51-1 and 51-2 constitute the above-described distributed processing system as devices that operate under the control of the call processors 41-11 to 41-1N and 41-21 to 41-2N during the course of call processing but operate under the control of the signaling/path processors 42-1 and 42-2 during the course of reconfiguration (mentioned above).

Incidentally, in the above conventional example, an event that may become a factor because of which the state-of-devices of the signaling controllers 51-1 and 51-2 should be changed is not necessarily recognized by the signaling/path processors 42-1 and 42-2 and may be detected by the call processors 41-11 to 41-1N and 41-21 to 41-2N that lead call processing.

However, in such a case, the signaling/path processors 42-1 and 42-2 perform no reconfiguration and the call processors 41-11 to 41-1N and 41-21 to 41-2N simply continue call processing for the call concerned.

Therefore, during the course of call processing that is performed by the call processors 41-11 to 41-1N and 41-21 to 41-2N, there is a possibility that an uncompleted call occurs unduly because a result of reconfiguration caused by an event of the above kind is not recognized at all.

It is technically possible to avoid such an uncompleted call in such a manner that the signaling/path processors 42-1 and 42-2 and the call processors 41-11 to 41-1N and 41-21 to 41-2N notify each other via the above-described channels and fixed communication links about events for which reconfiguration should be performed that causes certain changes in state-of-devices, among individually recognized events.

However, one of the signaling/path processors 42-1 and 42-2 and one of the call processors 41-11 to 41-1N and 4121 to 41-2N can be configured as, for example, a process (thread) that is executed by a common physical processor in accordance with the scale and other specifications of the exchange.

Therefore, in actuality the above-mentioned avoidance of an uncompleted call is not attained due to limitations of standardization of configuration and cost reduction because it is not attained unless a software configuration is optimized when necessary in accordance with a hardware configuration that has been adapted to specifications.

SUMMARY OF THE INVENTION

An object of the present invention is to adapt itself to a variety of configurations and scales without preventing standardization relating to the hardware and software, as well as to unify configurations of devices at a low cost.

Another object of the invention is to suppress increases in costs that are required for manufacturing, adjustment, maintenance, and operation of an information processing system and a facility to which the invention is applied, as well as to keep the performance and the reliability of such an information processing system and facility high in a stable manner.

Another object of the invention is to allow first processors and second processors to recognize the states of operation in respective devices as a unified view with greater exactitude than in the conventional example.

Still another object of the invention is to enable flexible adaptation to a variety of forms of reconfiguration as well as to facilitate unified management of one or both of first and second storage section as long as the desired level of reliability is maintained.

Yet another object of the invention is to allow second processors to notify first processors of an event with great exactitude.

A further object of the invention is to allow first processors to notify second processors of a result of reconfiguration with great exactitude.

Another object of the invention is to enable itself to flexibly adapt to a desired configuration without preventing standardization relating to the hardware and software.

The above objects are attained by a distributed-processing equipment comprising a first storage section in which identifiers of first processors that reconfigures respective devices are registered in advance, wherein when a second processor has detected an event for which one of the devices is reconfigured, the second processor notifies, of the event, to a first processor indicated by an identifier that is registered in the first storage section as corresponding to the device.

In this distributed-processing equipment, the states of operation in the respective devices can be recognized as a unified view by the first processors and the second processors with greater exactitude than in the conventional example in which none of the first processors are notified of such an event.

The above objects are attained by a distributed-processing equipment comprising first processors monitoring states of operation in devices and reconfiguring the devices according to a result of the monitoring, and second processors cooperating with the devices according to a predetermined procedure, wherein the first storage section is provided as a shared variable of the second processors.

In this distributed-processing equipment, the first storage section can flexibly adapt to a variety of forms of reconfiguration and easily managed in a unified manner as long as a desired level of reliability is maintained.

The above objects are attained by a distributed-processing equipment comprising a second storage section in which identifiers of second processors that performs predetermined processing (except reconfiguration) while cooperating with respective devices in a dedicated manner, wherein first processors notify of a result of the reconfiguration that is adapted to an event that occurred in a device, to a second processor indicated by an identifier that is registered in the second storage section corresponding to a device that is reconfigured.

In this distributed-processing equipment, the states of operation in the respective devices can be recognized as a unified view by the second processors and the first processors with greater exactitude than in the conventional example in which none of the second processors are notified of a result of such reconfiguration.

The above objects are attained by a distributed-processing equipment wherein the second storage section is provided as a shared variable of the first processors.

In this distributed-processing equipment, the second storage section can adapt to a variety of forms of reconfiguration more flexibly than in cases where the second storage section is distributed as private variables to the respective first processors or is provided in the first processors in a divided manner in accordance with the forms of load distribution and functional distribution relating to the respective devices. And the second storage section also is managed in a unified manner more easily as long as a desired level of reliability is maintained.

The above objects are attained by a distributed-processing equipment wherein operating states of communication links that are used for inter-processor communication between all or part of the first processors and the second processors are monitored, where the all or part of the second processors judge whether a communication link to be connected to a desired first processor is normal according to a result of the monitoring, and if the result of the judgment is false, a replacement link is used.

In this distributed-processing equipment, since the communication links to be used for inter-processor communication are formed redundantly, the second processors can notify the first processors of an event of the above kind with great exactitude.

The above objects are attained by a distributed-processing equipment wherein operating states of communication links that are used for inter-processor communication between all or part of the first processors and the second processors are monitored, where all or part of the first processors judge whether a communication link to be connected to a desired second processor is normal, according to a result of the monitoring, and if the result of the judgment is false, a replacement link is used.

In this distributed-processing equipment, since the communication links to be used for inter-processor communication are formed redundantly, the first processors can notify the second processors of the result of reconfiguration with great exactitude.

Further, the above objects are attained by a distributed-processing equipment wherein some of the first processors and the second processors are configured as a process (including a thread) that is executed by a single information processing equipment.

This distributed-processing equipment can flexibly adapt to a desired configuration without preventing standardization.

Other and further objects and features of the invention will become apparent from the following detailed description taken in connection with the accompanying drawings.

BRIEF DESCRIPTION OF THE DRAWINGS

The nature, principle, and utility of the invention will become more apparent from the following detailed description when read in conjunction with the accompanying drawings, in which like parts are designated by identical reference numbers, in which:

FIG. 12 is a block diagram showing an example of an exchange that is configured as a distributed processing system.

DETAILED DESCRIPTION OF THE PREFERRED EMBODIMENTS

The principles of distributed-processing equipments according to the present invention will be described with reference to FIGS. 1 and 2.

Figure 1:
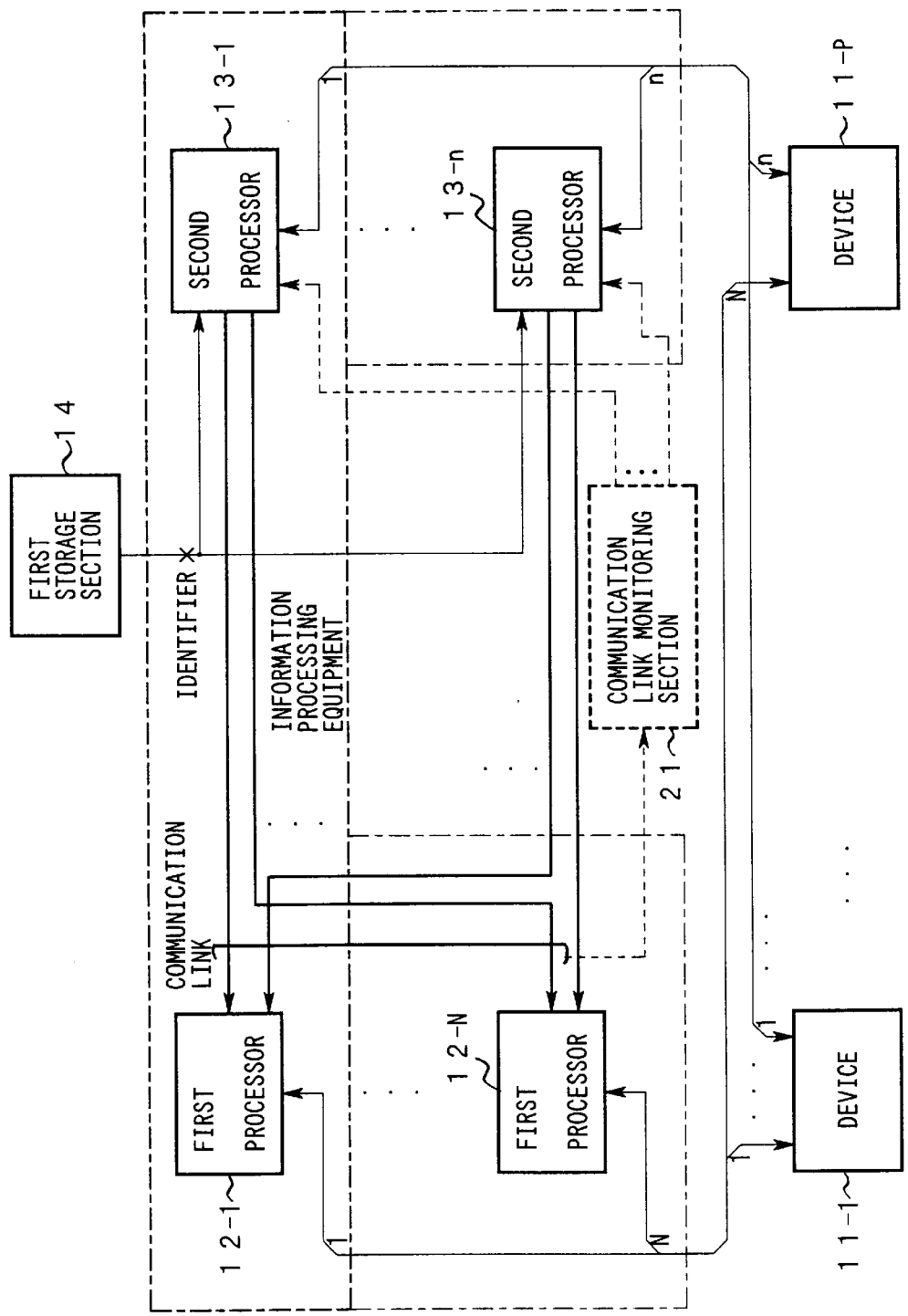
FIG. 1 is a first block diagram showing the principles of distributed-processing equipments according to the present invention.

FIG. 1 is a first block diagram showing the principles of distributed-processing equipments according to the invention.

Distributed-processing equipments shown in FIG. 1 are composed of first processors 12-1 to 12-N reconfiguring a plurality of devices 11-1 to 11-P, second processors 13-1 to 13-n that cooperate with the first processors 12-1 to 12-N via communication links which also cooperate with the devices 11-1 to 11-P, a first storage section 14 that is referred to by the second processors 13-1 to 13-n, and a communication link monitoring section 21 monitoring operating states of the respective communication links.

The principle of a first distributed-processing equipment according to the invention is as follows.

The singular or plurality of first processors 12-1 to 12-N monitor operating states of the plurality of devices 11-1 to 11-P having a redundant structure and reconfigure the devices 11-1 to 11-P in accordance with a result of the monitoring and the form of the redundant structure, where the first processors are less than or equal to the number of the devices. The singular or plurality of second processors 13-1 to 13-n cooperate with the devices having functions other than performing the reconfiguration, of functions that the P of devices 11-1 to 11-P have, where the second processors are less than or equal to the number of the devices. Identifiers of part of the first processors 12-1 to 12-N that reconfigure the respective devices 11-1 to 11-P are registered in advance in the first storage section 14.

When an event that may cause reconfiguration in one of the devices 11-1 to 11-P has occurred during the course of the cooperation, the second processors 13-1 to 13-n notify one of the first processors 11-1 to 11-P that is indicated by an identifier that is registered in the first storage section 14 corresponding to the device where the event has occurred.

In this distributed-processing equipment, the operating states of the devices 11-1 to 11-P can be recognized as a unified view by the first processors 12-1 to 12-N and the second processors 13-1 to 13-n with greater exactitude than in the conventional example in which none of the first processors 12-1 to 12-N are notified of such an event.

The principle of a second distributed-processing equipment according to the invention is as follows.

The first storage section 14 is configured as a shared variable of the singular or plurality of second processors 13-1 to 13-n.

In this distributed-processing equipment, the first storage section 14 can flexibly adapt to a variety of forms of reconfiguration and is easily managed in a unified manner as long as a desired level of reliability is maintained.

Figure 2:
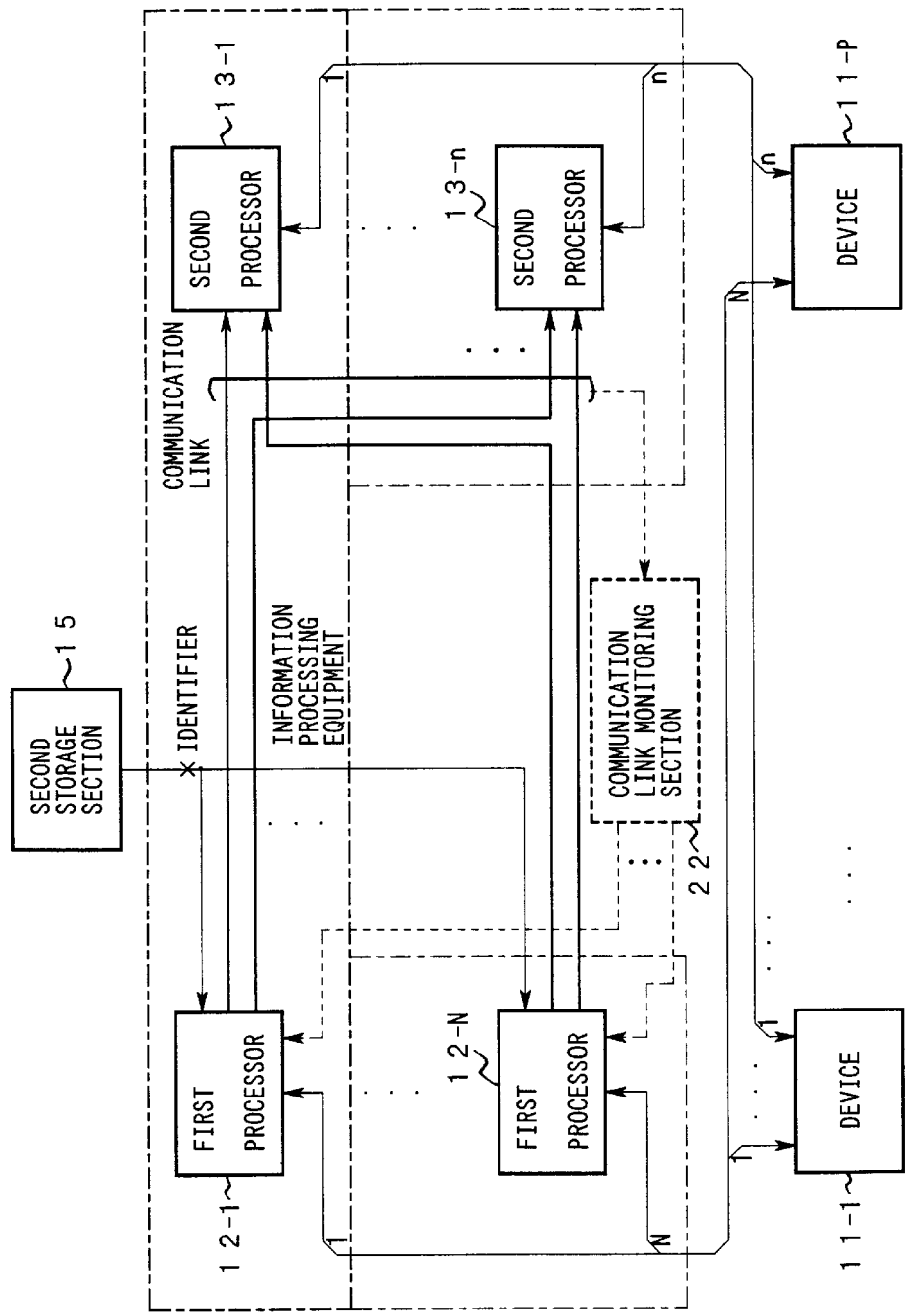
FIG. 2 is a second block diagram showing the principles of distributed-processing equipments according to the invention.

FIG. 2 is a second block diagram showing the principles of distributed-processing equipments according to the invention.

Distributed-processing equipments shown in FIG. 2 are composed of first processors 12-1 to 12-N reconfiguring a plurality of devices 11-1 to 11-P, second processors 13-1 to 13-n that cooperate with the first processors 12-1 to 12-N via communication links and also cooperate with the devices 11-1 to 11-P, a second storage section 15 that is referred to by the second processors 13-1 to 13-n, and a communication link monitoring section 22 monitoring operating states of the respective communication links.

The principle of a third distributed-processing equipment according to the invention is as follows.

The singular or plurality of first processors 12-1 to 12-N monitor operating states of the plurality of devices 11-1 to 11-P having a redundant structure and reconfigure the devices 11-1 to 11-P in accordance with a result of the monitoring and the form of the redundant structure, where the first processors are less than or equal to the number of the devices. The singular or plurality of second processors 13-1 to 13-n cooperate with the devices 11-1 to 11-P for part of the functions of the devices 11-1 to 11-P excluding functions relating to reconfiguration, where the second processors are less than or equal to the number of the devices. Identifiers of part of the second processors 13-1 to 13-n that cooperate with the respective devices 11-1 to 11-P are registered in advance in the second storage section 15. The first processors 11-1 to 11-N notify of a result of the reconfiguration to one of the second processors 13-1 to 13-n that is indicated by an identifier that is registered corresponding to a device that has become a subject of reconfiguration in the second storage section 15.

In this distributed-processing equipment, when an event for which reconfiguration is performed under the above-mentioned redundant structure has been detected in one of the devices 11-1 to 11-P by the first processors 12-1 to 12-N, a second processor 13-1 to 13-n that is to cooperate with the device where the event has occurred can obtain a result of reconfiguration even if the second processor cannot recognize the event.

Therefore, the operating states of the devices 11-1 to 11-P can be recognized by the first processors 12-1 to 12-N and the second processors 13-1 to 13-n with greater exactitude as a unified view than in the conventional example in which none of the second processors 13-1 to 13-N are notified of a result of such reconfiguration.

The principle of a fourth distributed-processing equipment is as follows.

The second storage section 15 is configured as a shared variable of the singular or plurality of first processors 12-1 to 12-n.

In this distributed-processing equipment, the second storage section 15 can adapt to a variety of forms of reconfiguration more flexibly than in cases where the second storage section 15 is distributed as private variables of respective first processors 12-1 to 12-N or is provided in the first processors 12-1 to 12-N in a divided manner in accordance with the forms of load distribution and functional distribution relating to the devices 11-1 to 11-P. And the second storage section 15 is also easily managed in a unified manner as long as a desired level of reliability is maintained The principle of a fifth distributed-processing equipment according to the invention is as follows.

The communication link monitoring section 21 monitors operating states of the respective communication links that are used for inter-processor communication between the singular or plurality of second processors 13-1 to 13-n and the singular or plurality of first processors 12-1 to 12-N.

The second processors 13-1 to 13-n judge whether a communication link that is connected to one of the first processors 12-1 to 12-N that is notified of an event is normal based on a result of the monitoring by the communication link monitoring section 21. If a result of the judgment is false, the second processors 13-1 to 13-N use a replacement link that is given according to the result of the monitoring.

In this distributed-processing equipment, since the communication links that are used for inter-processor communication are configured redundantly, an event of the above kind can be communicated with great exactitude from the second processors 13-1 to 13-n to the first processors 12-1 to 12-N.

The principle of a sixth distributed-processing equipment according to the invention is as follows.

The communication link monitoring section 22 monitors operating states of the respective communication links that are used for inter-processor communication and extend from the singular or plurality of first processors 12-1 to 12-N to the one of plurality of second processors 13-1 to 13-n.

The first processors 12-1 to 12-N judge whether a communication link that is connected to one of the second processors 13-1 to 13-n that is notified of a result of reconfiguration is normal according to a result of the monitoring by the communication link monitoring section 22. If a result of the judgment is false, the first processors 12-1 to 12-N use a replacement link that is given according to the result of the monitoring.

In this distributed-processing equipment, since the communication links that are used for inter-processor communication are configured redundantly, a result of reconfiguration of the above kind can be communicated with great exactitude between the first processors 12-1 to 12-N and the second processors 13-1 to 13-n.

The principle of a seventh distributed-processing equipment according to the invention is as follows.

A part of one of the singular or plurality of first processors 12-1 to 12-N and the singular or plurality of second processors 13-1 to 13-n and a part or all of the other one of the two processors are configured as a process or a set of processes to be executed by a single information processing equipment.

In this distributed-processing equipment, in general, inter-process communication is realized between the first processors and the second processors that are configured as the process or the set of processes by performing message passing (including remote procedure calling) or using the above-mentioned shared variable.

This enables flexible adaptation to a desired configuration without preventing standardization.

The principle of an eighth distributed-processing equipment according to the invention is as follows.

The singular or plurality of first processors 12-1 to 12-N monitor operating states of the plurality of devices 11-1 to 11-P having a redundant structure and reconfigure the devices 11-1 to 11-P in accordance with a result of the monitoring and the form of the redundant structure, where the first processors are less than or equal to the number of the devices. The singular or plurality of second processors 13-1 to 13-n cooperate with the devices 11-1 to 11-P for part of the functions of the devices 11-1 to 11-P excluding functions relating to reconfiguration, where the second processors are less than or equal to the number of the devices. Identifiers of the first processors 12-1 to 12-N that reconfigure the respective devices 11-1 to 11-P are registered in advance in the first storage section 14. When an event that may cause reconfiguration in one of the devices 11-1 to 11-P has occurred during the course of the cooperation, the second processors 13-1 to 13-n notify one of the first processors 12-1 to 12-N that is indicated by an identifier that is registered corresponding to the device where the event has occurred in the first storage section 14.

In this distributed-processing equipment, when an event for which reconfiguration is performed under the above-mentioned redundant structure has been detected in one of the devices 11-1 to 11-P by the second processors 13-1 to 13-N, one of the first processors 12-1 to 12-N that is to reconfigure the device where the event has occurred can perform reconfiguration even if the first processor cannot detect the event.

Therefore, the operating states of the devices 11-1 to 11-P can be recognized as a unified view by the first processors 12-1 to 12-N and the second processors 13-1 to 13-n with greater exactitude than in the conventional example in which none of the first processors 12-1 to 12-N are notified of such an event.

The principle of a ninth distributed-processing equipment according to the invention is as follows.

The first storage section 14 is configured as a shared variable of the singular or plurality of second processors 13-1 to 13-n.

In this distributed-processing equipment, the first storage section 14 can adapt to a variety of forms of reconfiguration more flexibly than in cases where the first storage section 14 is distributed as private variables of the respective second processors 13-1 to 13-n or is provided in the second processors 13-1 to 13-n in a divided manner in accordance with the forms of load distribution and functional distribution relating to the devices 11-1 to 11-P. And the first storage section is also easily managed in a unified manner as long as a desired level of reliability is maintained.

The principle of a tenth distributed-processing equipment according to the invention is as follows.

The singular or plurality of first processors 12-1 to 12-N monitor operating states of the plurality of devices 11-1 to 11-P having a redundant structure and reconfigure the devices 11-1 to 11-P in accordance with a result of the monitoring and the form of the redundant structure, where the first processors are less than or equal to the number of the devices. The singular or plurality of second processors 13-1 to 13-n cooperate with the devices 11-1 to 11-P for part of the functions of the devices 11-1 to 11-P excluding functions relating to reconfiguration, where the second processors are less than or equal to the number of the devices. Identifiers of part of the second processors 13-1 to 13-n that cooperate with the respective devices 11-1 to 11-P are registered in advance in the second storage section 15. The first processors 12-1 to 12-N notify of a result of the reconfiguration to one of the second processors 13-1 to 13-n that is indicated by an identifier that is registered in the second storage section 15 corresponding to a device that has become a subject of reconfiguration.

In this distributed-processing equipment, when an event for which reconfiguration is performed under the above-mentioned redundant structure has been detected in one of the devices 11-1 to 11-P by the first processors 12-1 to 12-N, one of the second processors 13-1 to 13-n that is to cooperate with the device where the event has occurred can obtain a result of reconfiguration that has been performed in response to the event even if the second processor cannot recognize the event.

Therefore, the operating states of the devices 11-1 to 11-P can be recognized as a unified view by the first processors 12-1 to 12-N and the second processors 13-1 to 13-n with greater exactitude than in the conventional example in which none of the second processors 13-1 to 13-n are notified of a result of such reconfiguration.

The principle of an 11th distributed-processing equipment is as follows.

The second storage section 15 is configured as a shared variable of the singular or plurality of first processors 12-1 to 12-N.

In this distributed-processing equipment, the second storage section 15 can adapt to a variety of forms of reconfiguration more flexibly than in cases where the second storage section 15 is distributed as private variables of respective first processors 12-1 to 12-N or is provided in the first processors 12-1 to 12-N in a divided manner in accordance with the forms of load distribution and functional distribution relating to the devices 11-1 to 11-P. And the second storage section 15 also is easily managed in a unified manner as long as a desired level of reliability is maintained.

The principle of a 12th distributed-processing equipment according to the invention is as follows.

The communication link monitoring section 21 monitors operating states of the respective communication links that are used for inter-processor communication between the singular or plurality of second processors 13-1 to 13-n and the singular or plurality of first processors 12-1 to 12-N. The second processors 13-1 to 13-n judge whether a communication link that is connected to one of the first processors 12-1 to 12-N that is notified of an event is normal according to a result of the monitoring by the communication link monitoring section 21. If a result of the judgment is false, the second processors 13-1 to 13-N use a replacement link that is given according to the result of the monitoring.

In this distributed-processing equipment, since the communication links that are used for inter-processor communication are configured redundantly, an event of the above kind can be communicated with great exactitude from the second processors 13-1 to 13-n to the first processors 12-1 to 12-N.

The principle of a 13th distributed-processing equipment according to the invention is as follows.

The communication link monitoring section 22 monitors operating states of the respective communication links that are used for inter-processor communication between the singular or plurality of first processors 12-1 to 12-N and the singular or plurality of second processors 13-1 to 13-n. The first processors 12-1 to 12-N judge whether a communication link that is connected to one of the second processors 13-1 to 13-n that is notified of a result of reconfiguration is normal according to a result of the monitoring by the communication link monitoring section 22. If a result of the judgment is false, the first processors 12-1 to 12-N use a replacement link that is given based on the result of the monitoring.

In this distributed-processing equipment, since the communication links that are used for inter-processor communication are configured redundantly, a result of reconfiguration of the above kind can be communicated with great exactitude from the first processors 12-1 to 12-N to the second processors 13-1 to 13-n.

The principle of a 14th distributed-processing equipment according to the invention is as follows.

A part of one of the singular or plurality of first processors 12-1 to 12-N or the singular or plurality of second processors 13-1 to 13-n and a part or all of the other one of the two processors are configured as a process or a set of processes to be executed by a single information processing equipment.

In this distributed-processing equipment, in general, inter-process communication is realized between the first processors and the second processors that are configured as the process or the set of processes by performing message passing (including remote procedure calling) or using the above-mentioned shared variable.

This enables flexible adaptation to a desired configuration without preventing standardization.

Embodiments of the invention will be hereinafter described in detail with reference to the drawings.

Figure 3:
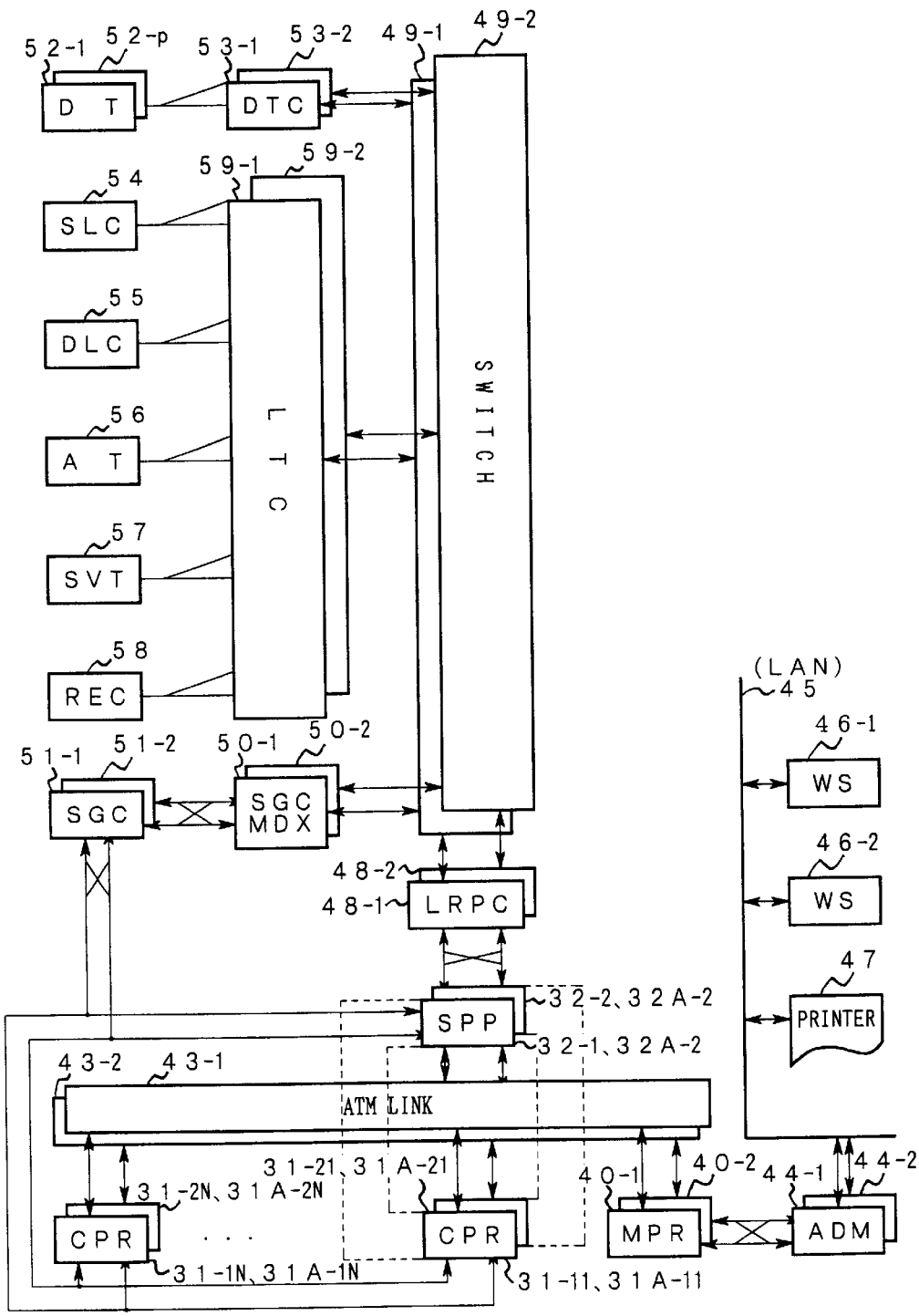
FIG. 3 is a block diagram showing first to fourth embodiments.

FIG. 3 shows first to fourth embodiments of the invention.

The components in FIG. 3 that are the same in function and configuration as the corresponding components in FIG. 12 are given the same reference symbols as the latter and will not be described below in detail.

This embodiment is different in configuration from the conventional example of FIG. 12 in that call processors (CPR) 31-11 to 31-1N and 31-21 to 31-2N are provided in place of the call processors 41-11 to 41-1N and 41-21 to 41-2N and that signaling/path processors (SPP) 32-1 and 32-2 are provided in place of the signaling/path processors 42-1 and 42-2.

Figure 4:
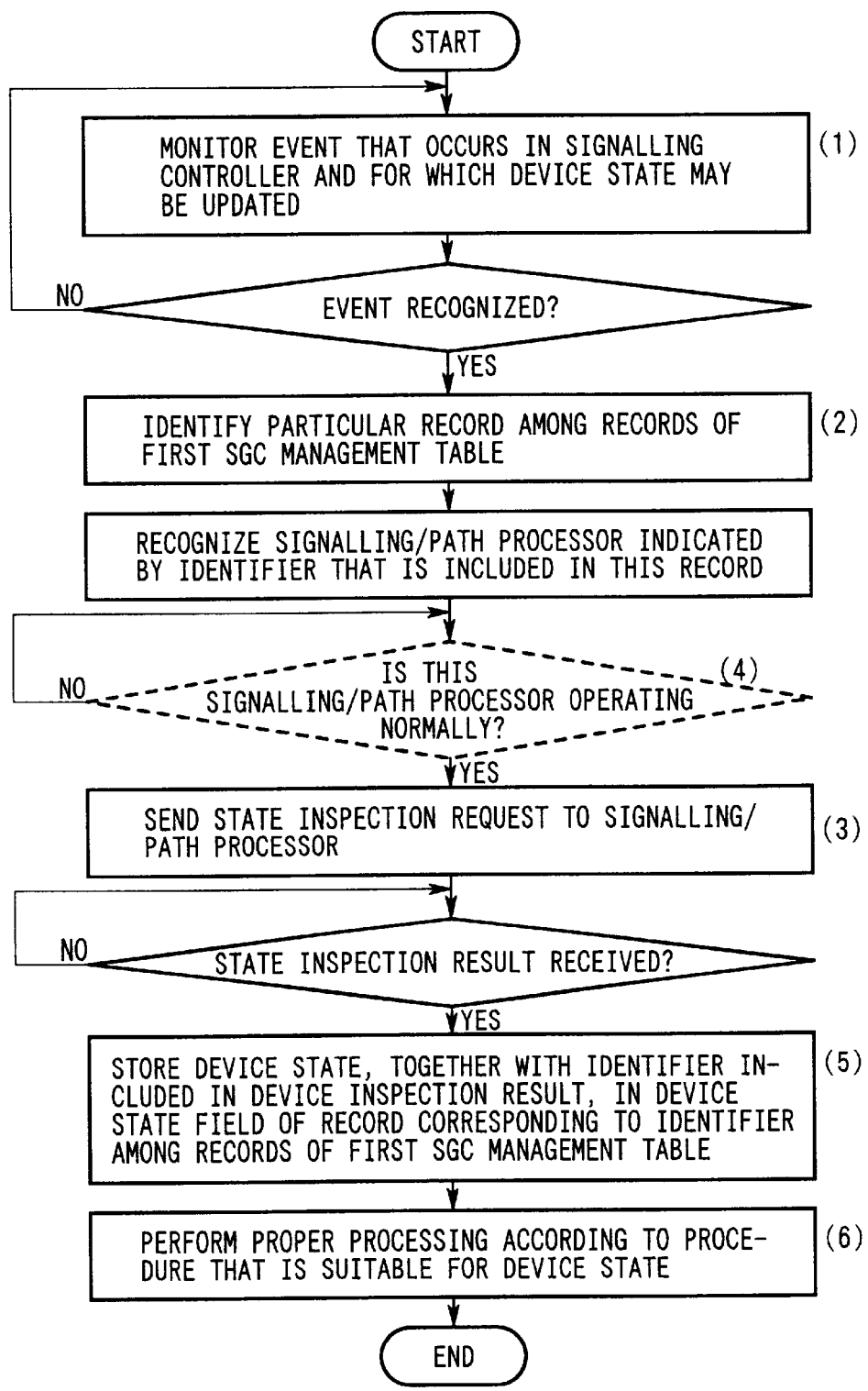
FIG. 4 is a process flowchart of the first embodiment.
Figure 5:
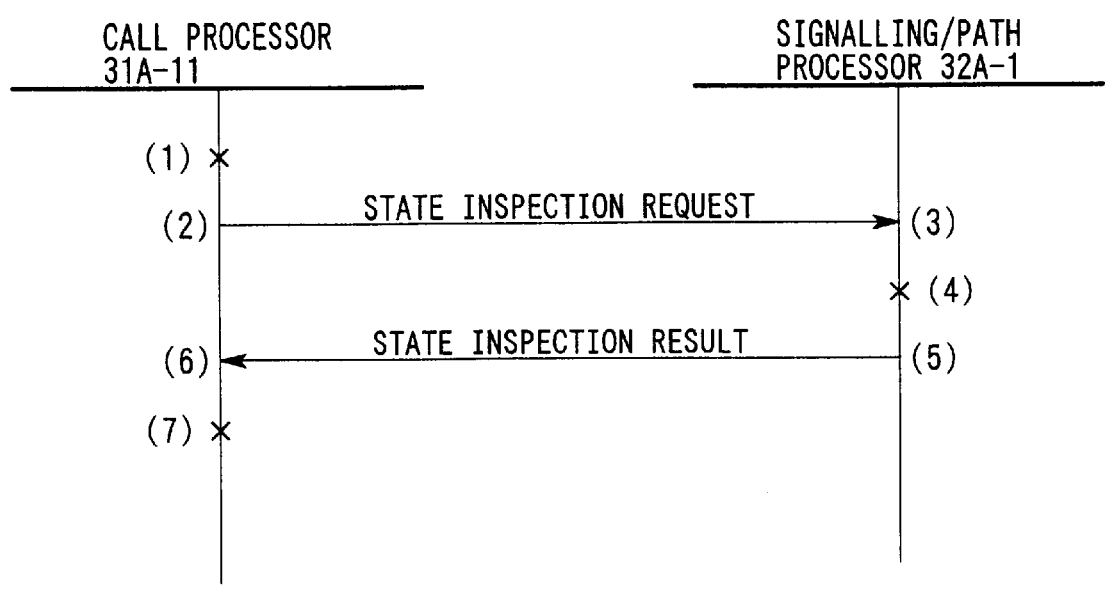
FIG. 5 is a chart showing the operation of the first embodiment.

FIG. 4 is a process flowchart of the first embodiment, and FIG. 5 is a chart showing the operation of the first embodiment.

The operation of the first embodiment of the invention will be hereinafter described with reference to FIGS. 3–5.

Figure 6:
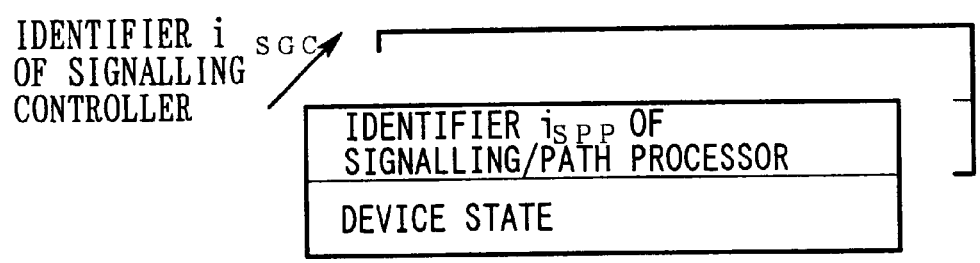
FIG. 6 is a chart showing the structure of a first SGC table.

As shown in FIG. 6, the call processors 31-11 to 31-1N and 31-21 to 31-2N have, as office data, a "first SGC management table" consisting of records each of which includes the following items relating to the corresponding one of the signaling controllers 51-1 and 51-2 and is correlated with a unique identifier $i_{SGC}$ that indicates the corresponding signaling controller:

An identifier $i_{spp}$ indicating a signaling/path processor (i.e., one of the signaling/path processors 32-1 and 32-2) that monitors operating states and performs reconfiguration based on a result of the monitoring.

State-of-device.

For the sake of simplicity, it is assumed that the identifier $i_{SGC}$ is a suffix "1" or "2" that is affixed to the reference numeral "51." The identifier $i_{spp}$ is assumed to be a suffix "1" or "2" that is affixed to the reference numeral "32."

For example, during the course of call processing, the call processor 31-11, among the call processors 31-11 to 31-1N and 31-21 to 31-2N, monitors an event for which the state-of-device of one (for simplicity, assumed to be the signaling controller 51-1) of the signaling controllers 51-1 and 51-2 may or should be updated (step (1) in FIG. 4 and symbol (1) in FIG. 5).

Examples of such an event are:

The ratio of uncompleted calls to all calls for which the signaling controller 51-1 was used during the course of call processing has exceeded a predetermined upper limit.

Some abnormal state has occurred during the course of driving of the signaling controller 51-1 and it has been recognized that recovery from the abnormal state is not made even by a retrial.

When recognizing such an event, the call processor 31-11 identifies a record (hereinafter referred to as "particular record") corresponding to the identifier "1" of the signaling controller 51-1 concerned from the records of the first SGC management table (step (2) in FIG. 4).

Then, the call processor 31-11 sends a "state inspection request" indicating this fact and including the identifier "1" of the signaling controller 51-1 to one of the signaling/path processors 32-1 and 32-2 that is indicated by the identifier $i_{spp}$ (for simplicity, assumed to be "1") that is included in the particular record (step (3) in FIG. 4 and symbol (2) in FIG. 5).

However, when the signaling/path processor to which the "state inspection request" is to be sent is not operating normally (including an non-mounted state and a state that its starting has not been completed yet) under the system configuration at that time point, the call processor 31-11 refrains from sending the "state inspection request" (step (4) in FIG. 4).

When recognizing the "state inspection request", the signaling/path processor 32-1 identifies the following signal controller and event (symbol (3) in FIG. 5):

Of the signaling controller 51-1 and 51-2, the signaling controller 51-1 that is indicated by the identifier included in the "state inspection request".

The event indicated by the "state inspection request".

Then, the signaling/path processor 32-1 judges whether it is necessary to reconfigure the signal controller 51-1 on the basis of a standard that conforms to this event. When the judgment result is true, the signaling/path processor 32-1 performs, for example, processing for one or both of the following and updates the state-of-device in accordance with a result of the processing (symbol (4) in FIG. 5):

Restriction of operation.

Replacement by the signaling controller 51-2.

Then, the signaling/path processor 32-1 sends a "state inspection result" including the identifier of the signaling controller 51-1 and information on the state of its device to the call processor 31-11, among the call processors 31-11 to 31-1N and 31-21 to 31-2N, that is the sender of the "state inspection request" (symbol (5) in FIG. 5).

The call processor 31-11 stores the received identifier and the state-of-device included in the received "state inspection result" in the state-of-device field of the record corresponding to the identifier included in the "state inspection result" among the records of the first SGC management table (step (5) in FIG. 4 and symbol (6) in FIG. 5).

Then, during the course of call processing, the call processor 31-11 performs proper processing (e.g., processing of refraining from performing call processing for the call concerned) according to a procedure that is suitable for the state-of-device (step (6) in FIG. 4 and symbol (7) in FIG. 5).

In this manner, as for the signal controllers 51-1 and 51-2, when an event of the above kind is recognized by the call processors 31-11 to 31-1N and 31-21 to 31-2N, reconfiguration and state-of-device updating that are suitable for the event are performed reliably even if the event is not recognized by the signaling/path processors 32-1 and 32-2.

As described above, according to this embodiment, a state-of-device that has been updated during the course of reconfiguration of the redundant signaling controllers 51-1 and 51-2 is recognized more reliably by both of the call processors 31-11 to 31-1N and 31-21 to 31-2N and the signaling/path processors 32-1 and -32-2 than in the conventional example without alteration of the following:

The hardware configuration.

The basic configuration of software to be incorporated in the call processors 31-11 to 31-1N and 31-21 to 31-2N and the signaling/path processors 32-1 and 32-2.

Therefore, an exchange to which this embodiment is applied can flexibly adapt to the scale and other specifications at a low cost without impairing standardization relating to the hardware and software.

In this embodiment, the first SGC management table is provided as office data that is common to the call processors 31-11 to 31-1N and 31-21 to 31-2N. Alternatively, the first SGC management table may be divided into a plurality of SGC management tables as long as they conform to the forms of functional distribution and load distribution that are attained by the call processors 31-11 to 31-1N and 31-21 to 31-2N and are unified properly. As a further alternative, the first SGC management table may be provided as shared variables each of which is shared by every group consisting of one or a plurality of call processors among the call processors 31-11 to 31-1N and 31-21 to 31-2N.

Figure 7:
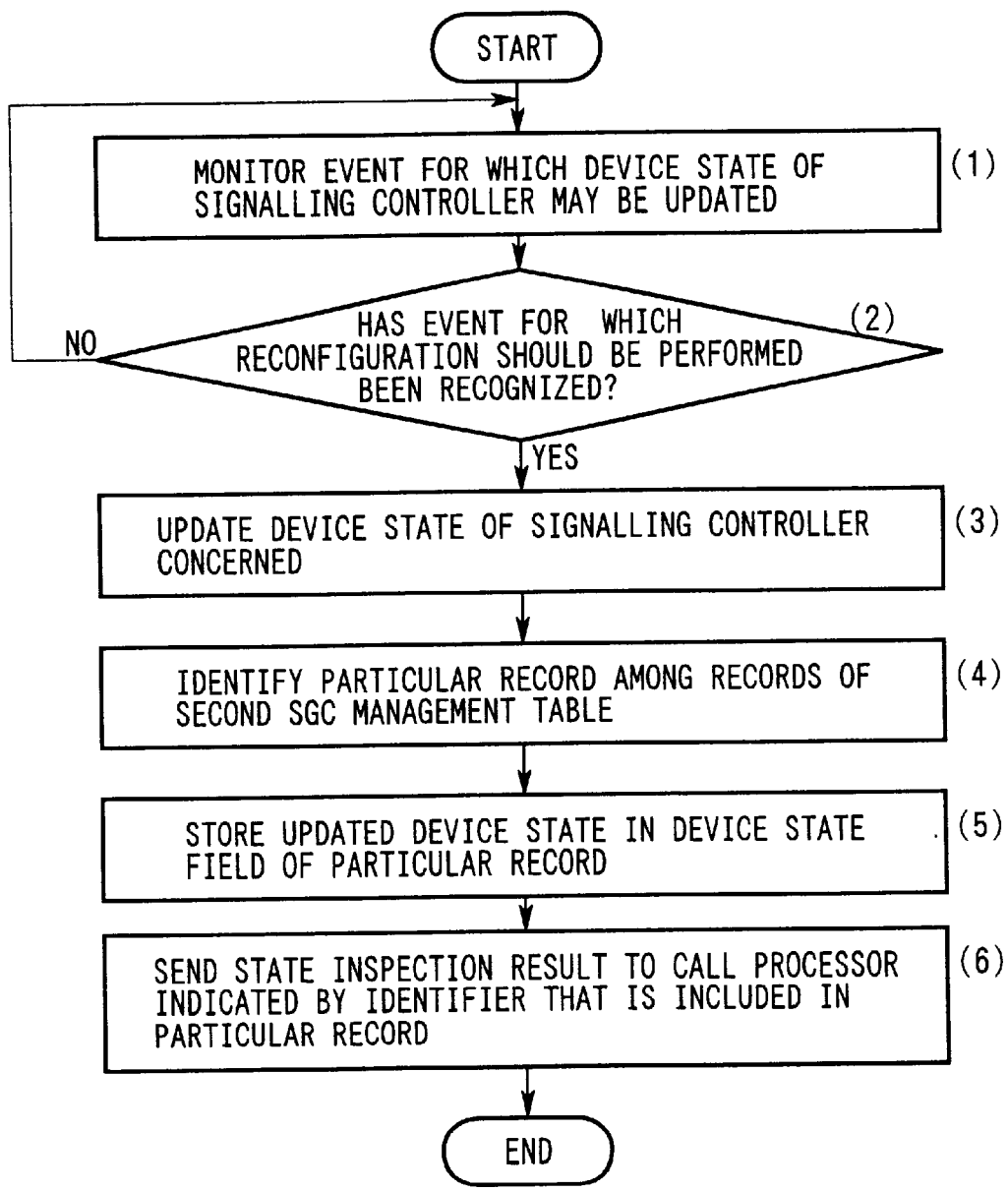
FIG. 7 is a process flowchart of the second embodiment.
Figure 8:
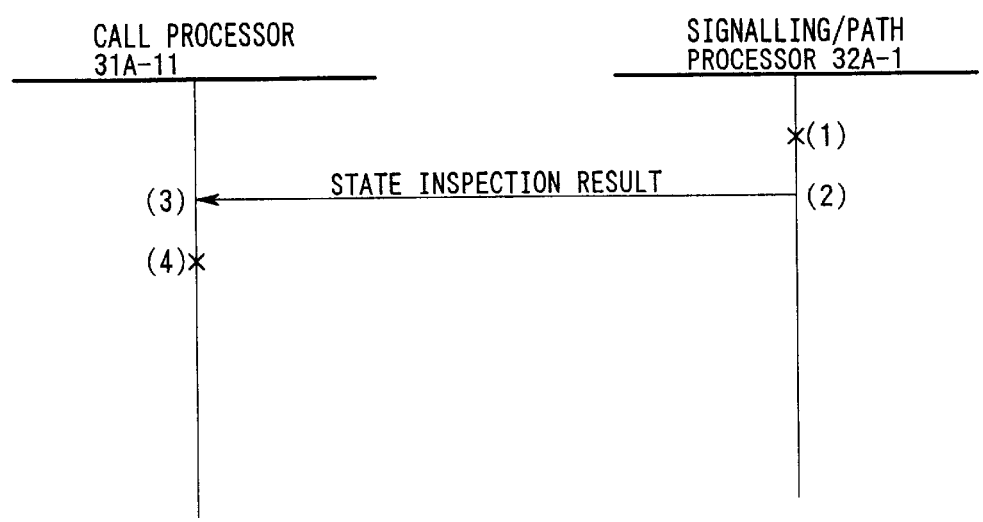
FIG. 8 is a chart showing the operation of the second embodiment.

FIG. 7 is a process flowchart of the second embodiment of the invention, and FIG. 8 is a chart showing the operation of the second embodiment.

This embodiment is different from the first embodiment in that call processors 31A-11 to 31A-1N and 31A-21 to 31A-2N are provided in place of the call processors 31-11 to 31-1N and 31-21 to 31-2N and that signaling/path processors 32A-1 and 32A-2 are provided in place of the signaling/path processors 32-1 and 32-2.

The operation of the second embodiment will be described below with reference to FIGS. 3 and 6–9.

Figure 9:
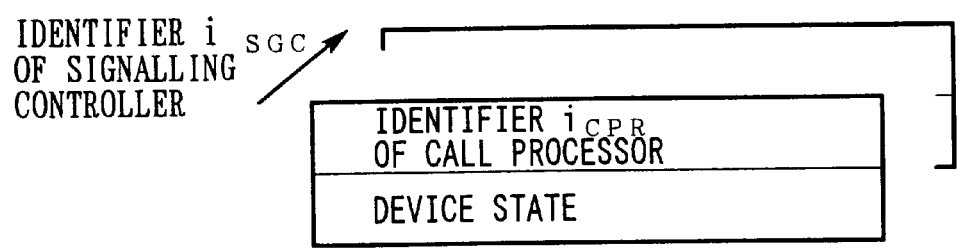
FIG. 9 is a chart showing the structure of a second SGC table.

As shown in FIG. 9, the signaling/path processors 32A-1 and 32A-2 have, as station information, a "second SGC management table" consisting of records each of which includes the following items relating to the corresponding one of the signaling controllers 51-1 and 51-2 and is correlated with a unique identifier $i_{SGC}$ that indicates the corresponding signaling controller:

An identifier $i_{CPR}$ indicating a call processor (i.e., one of the call processors 31A-11 to 31A-1N and 31A21 to 31A-2N) that performs driving in a dedicated manner according to a procedure of call processing.

State-of-device.

For simplicity, it is assumed that the identifier $i_{CPR}$ is one of the suffixes "11" to "1N" and "21" to "2N" that are affixed to the reference symbol "31A."

For example, the signaling/path processor 32A-1 of the signaling/path processors 32A-1 and 32A-2 monitors an event for which the state-of-device of one (for simplicity, assumed to be the signaling controller 51-1) of the signaling controllers 51-1 and 51-2 may or should be updated (step (1) in FIG. 7 and symbol (1) in FIG. 8).

Examples of such an event are:

Occurrence of alarm information that is given as a message by the signaling controller 51-1.

Occurrence of a request that is given by an operator via the monitoring processors 44-1 and 44-2 etc. and that section that the operation of the signaling controller 51-1 is suspended.

Based on a standard suitable for an event, the signaling/path processor 32A-1 judges whether reconfiguration is necessary (step (2) in FIG. 7). When the judgment result is true, the signaling/path processor 32A-1 performs, for example, processing for one or both of the following on the signaling controller 51-1 and updates the state-of-device in accordance with a result of the processing (step (3) in FIG. 7):

Restriction of operation.

Replacement by the signaling controller 51-2.

Then, the signaling/path processor 32A-1 identifies a record (hereinafter referred to as "particular record") corresponding to the identifier of the signaling controller 51-1 concerned from the records of the second SGC management table (step (4) in FIG. 7), and stores the state-of-device that has been updated or determined in the above manner in the state-of-device field of the particular record (step (5) in FIG. 7).

Then, the signaling/path processor 32A-1 sends a "state inspection request" including the identifier of the signaling controller 51-1 and the device information of the signaling controller 51-1 that has been updated or determined in the above manner to one, of the call processors 31A-11 to 31A-1N and 31A-21 to 31A-2N, that is indicated by the identifier $i_{CPR}$ (for simplicity, assumed to be "1") that is included in the particular record (step (6) in FIG. 7 and symbol (2) in FIG. 8).

On the other hand, the call processor 31A-1 recognizes the following signaling controller and state-of-device (symbol (3) in FIG. 8):

Of the signaling controller 51-1 and 51-2, the signaling controller 51-1 that is indicated by the identifier included in the "state inspection result".

The state-of-device included in the "state inspection result" together with the identifier.

Then, during the course of call processing to be performed by use of the thus-recognized signaling controller 51-1, the call processor 31A-11 performs processing (e.g., processing of suspending call processing for the call concerned) according to a procedure that is suitable for the state-of-device that has been recognized together with the signaling controller 51-1 (symbol (4) in FIG. 8).

In this manner, as for the signal controllers 51-1 and 51-2, when an event of the above kind is recognized by the signaling/path processors 32A-1 and 32A-2, a state-of-device that has been updated based on reconfiguration that is suitable for the event is recognized reliably also by the call processors 31A-11 to 31-1-N and 31A-21 to 31A-2N.

As described above, according to this embodiment, a state-of-device that has been updated during the course of reconfiguration of the redundant signaling controllers 51-1 and 51-2 is recognized more reliably by both of the signaling/path processors 32A-1 and 32A-2 and the call processors 31A-11 to 31-1-N and 31A-21 to 31A-2N than in the conventional example without alteration of the following:

The hardware configuration.

The basic configuration of software to be incorporated in the signaling/path processors 32A-1 and 32A-2 and the call processors 31A-11 to 31-1-N and 31A-21 to 31A-2N.

Therefore, an exchange to which this embodiment is applied can flexibly adapt to the scale and other specifications at a low cost without impairing standardization relating to the hardware and software.

In this embodiment, the second SGC management table is provided as office data that is common to the signaling/path processors 32A-1 and 32A-2. Alternatively, the second SGC management table may be divided into a plurality of SGC management tables as long as they conform to the forms of functional distribution and load distribution that are attained by the signaling/path processors 32A-1 and 32A-2 and are unified properly. As a further alternative, the second SGC management table may be provided as shared variables each of which is shared by a group consisting of one or a plurality of signaling/path processors in a case where the number of signaling/path processors denoted by the reference symbol "32A" is three or more.

Although the second embodiment has been described above as an independent embodiment, it may be combined with the first embodiment, for example.

Figure 10:
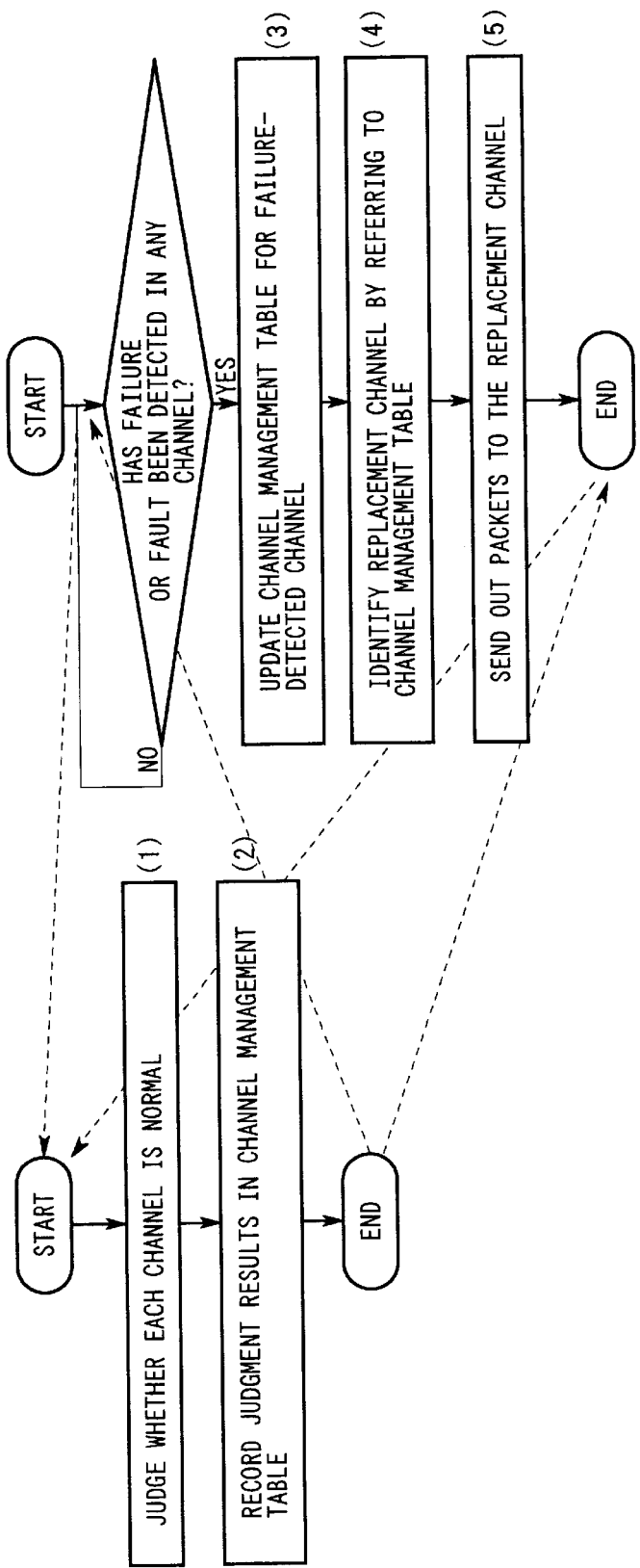
FIG. 10 is a process flowchart of the third embodiment.

FIG. 10 is a process flowchart of a third embodiment of the invention.

The operation of the third embodiment of the invention will be described below with reference to FIGS. 3 and 10.

Figure 11:
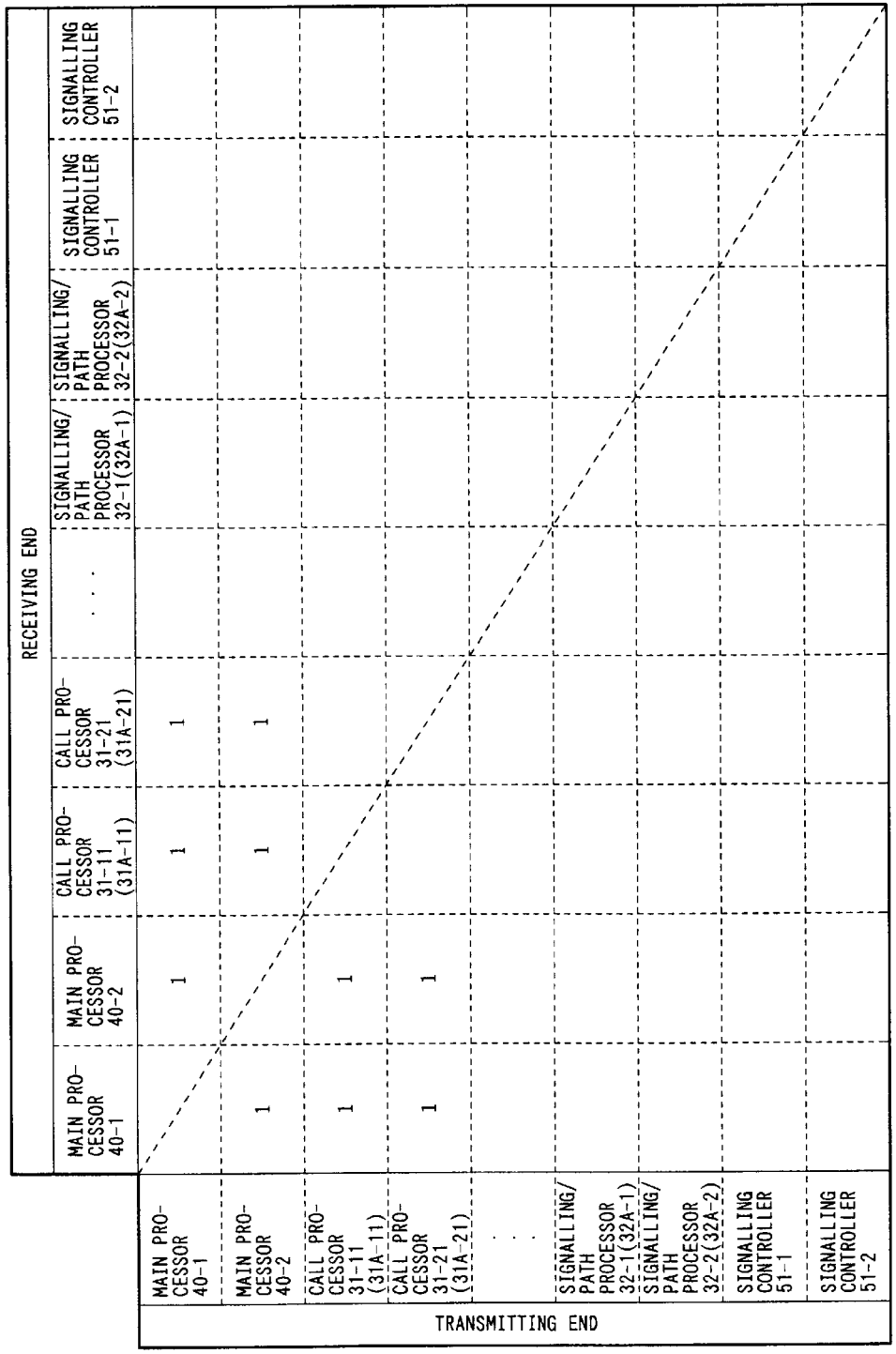
FIG. 11 is a chart showing the structure of a channel management table.

As shown in FIG. 11, the main processors 40-1 and 40-2, the call processors 31-11 to 31-1N (or 31A-11 to 31A-1N) and 31-21 to 31-2N (or 31A-21 to 31A-2N), and the signaling/path processors 32-1 (or 32A-1) and 32-2 (or 32A-2) have, as office data, a channel management table in which binary information indicating whether both kinds of channels below are normal is stored:

(a) The individual channels that are formed, as described previously, in mesh form in the ATM links 43-1 and 43-2.

(b) The individual channels that are formed in such a manner that the call processors 31-11 to 31-1N (or 31A-11 to 31A-1N) and 31-21 to 31-2N (or 31A-21 to 31A-2N), the signaling/path processors 32-1 (or 32A-1) and 32-2 (or 32A-2), and the signaling controllers 51-1 and 51-2 are directly connected to each other in mesh form.

Incidentally, during the course of a series of processing relating to call processing, maintenance/operation, etc., the main processors 40-1 and 40-2, the call processors 31-11 to 31-1N (or 31A-11 to 31A-1N) and 31-21 to 31-2N (or 31A-21 to 31A-2N), the signaling/path processors 32-1 (or 32A-1) and 32-2 (or 32A-2), the signaling multiplexing sections 50-1 and 50-2, the signaling controllers 51-1 and 51-2, the digital terminal shelves 53-1 and 53-2, and the line trunk shelves 59-1 and 59-2 cooperate with each other by exchanging predetermined messages via some of the above channels and the communication links (described previously).

During the course of exchanging such messages, the main processors 40-1 and 40-2, the call processors 31-11 to 31-1N (or 31A-11 to 31A-1N) and 31-21 to 31-2N (or 31A-21 to 31A-2N), and the signaling/path processors 32-1 (or 32A-1) and 32-2 (or 32A-2) judge whether the above channels (a) and (b) are normal by exchanging test packets at a predetermined frequency according to a predetermined communication procedure (step (1) in FIG. 10), and record judgment results (for simplicity, it is assumed here that they are expressed by binary information) in the above-mentioned channel management table (step (2) in FIG. 10).

The call processors 31-11 to 31-1N (or 31A-11 to 31A-1N) and 31-21 to 31-2N (or 31A-21 to 31A-2N) and the signaling/path processor 32-1 (or 32A-1) exchange, as datagram packets, a "state inspection request" and a "state inspection result" (described previously).

In this manner, during the course of exchanging a "state inspection request" and a "state inspection result", when the call processors 31-11 to 31-1N (or 31A-11 to 31A-1N) and 31-21 to 31-2N (or 31A-21 to 31A-2N) and the signaling/path processor 32-1 (or 32A-1) detect a failure or fault (for simplicity, here it is limited to ones from which recovery cannot be made by error correction or retrial) in predetermined layers (including the physical layer) of a channel used, they updates binary information that is registered in the channel management table as corresponding to the failure-detected channel (step (3) in FIG. 10).

Then, the call processors 31-11 to 31-1N (or 31A-11 to 31A-1N) and 31-21 to 31-2N (or 31A-21 to 31A-2N) and the signaling/path processor 32-1 (or 32A-1) identify a replacement channel that is a combination of a plurality of channels that can be used in place of the failure-detected channel by referring to values of the binary information registered in the channel management table (step (4) in FIG. 10), and send out packets concerned to the replacement channel (step (5) in FIG. 10).

Individual devices (some of the main processors 40-1 and 40-2, the call processors 31-11 to 31-1N (or 31A-11 to 31A-1N) and 31-21 to 31-2N (or 31A-21 to 31A-2N), and the signaling/path processors 32-1 (or 32A-1) and 32-2 (or 32A-2)) that are located at relay points of the thus-identified replacement channel sequentially route the packets by referring to the destination included in the received packets.

As described above, this embodiment can provide higher reliability than the first and second embodiments because channels to be used for passing of a "state inspection request" and a "state inspection result" are configured redundantly.

Although in this embodiment channels to be used for passing of both of a "state inspection request" and a "state inspection result" are configured redundantly, channels to be used for passing of only one of a "state inspection request" and a "state inspection result" may be configured redundantly.

A fourth embodiment of the invention will be described below.

This embodiment is different from the first to third embodiments in that as indicated by dotted lines in FIG. 3 the call processor 31-11 (or 31A-11) and the signaling/path processor 32-1 (or 32A-1) are combined into a single processor (hereinafter referred to as "first processor") and the call processor 31-21 (or 31A-21) and the signaling/path processor 32-2 (or 32A-2) are combined into a single processor (hereinafter referred to as "second processor").

The operation of the fourth embodiment will be described below with reference to FIG. 3.

The call processor 31-11 (or 31A-11) and the signaling/path processor 32-1 (or 32A-1) perform the same processing as in the first, second, or third embodiment by executing a predetermined process (task) or thread under process management by the operating system that is incorporated in the first processor.

The call processor 31-21 (or 32A-11) and the signal processor 32-2 (or 32A-2) perform the same processing as in the first, second, or third embodiment by executing a predetermined process (task) or thread under process management by the operating system that is incorporated in the second processor.

When it is necessary to send a certain message (e.g., a "state inspection request" (described above)) to another processor, the call processor 31-11 (or 31A-11) judges whether the destination of the message is the signaling/path processor 32-1 (or 32A-1). When the judgment result is false, the call processor 31-11 (or 31A-11) performs the same processing as in the first embodiment.

However, when the judgment result is true, the call processor 31-11 (or 31A-11) invokes a system call that is a request that the message be passed to the signal processor 32-1 (or 32A-1) the entity of which is the above-mentioned process (task) or thread via a desired communication channel or be passed as a shared variable like an argument of a test-and-set instruction or a semaphore.

Sending of a certain message by the call processor 31-21 (or 31A-21) to the signaling/path processor 32-2 (or 32A-2) is realized in such a manner that the call processor 31-21 (or 31A-21) likewise invokes a system call. Therefore, details of this processing are not described here.

Sending of a certain message (e.g., a "state inspection result" (described above)) by the signaling/path processor 32-1 (or 32A-1) to the call processor 31-11 (or 31A-11) and sending of a certain message by the signaling/path processor 32-2 (or 32A-2) to the call processor 31-21 (or 31A-21) is similarly realized in such a manner that the signaling/path processors 32-1 (or 32A-1) and 32-2 (or 32A-2) likewise invoke a system call, respectively.

As described above, in this embodiment, even in a case where a plurality of processors to become a sender and a destination of a message are configured as a process (task) or a thread that is executed by the physically same processor in accordance with the scale and the specification of a system, the plurality of processors can be set under reconfiguration without impairing standardization relating to the hardware and software and device configurations of respective updated sections can be recognized reliably as a unique view.

Each of the above embodiments is directed to the procedure and the operation subject to processing that is performed by the call processors 31-11 to 31-1N (or 31A-11 to 31A-1N) and 31-21 to 31-2N (or 31A-21 to 31A-2N) and the signaling/path processors 32-1 (or 32A-1) and 32-2 (or 32A-2) to recognize common state-of-devices for only the signaling controllers 51-1 and 51-2 that operate under the control of one of the call processors 31-11 to 31-1N (or 31A-11 to 31A-1N) and 31-21 to 31-2N (or 31A-21 to 31A-2N) during the course of call processing and operate under the control of the signaling/path processors 32-1 (or 32A-1) and 32-2 (or 32A-2) during the course of supervisory and control relating to reconfiguration of the system.

However, the invention is not limited to such processing for the signaling controllers 51-1 and 51-2; the invention can be applied to processing for any packages and modules such as the main processors 40-1 and 40-2, the ATM links 43-1 and 43-2, the monitoring processors 44-1 and 44-2, the signaling/path controllers 48-1 and 48-2, the switches 49-1 and 49-2, and the signaling multiplexing sections 50-1 and 50-2 shown in FIG. 3 as long as all of the following conditions are satisfied:

A certain redundant structure is applied.

They operate parallel under the control of a different processor (the entity of which may be a process (task) or a thread (described above)).

One of these processors leads setting and updating of state-of-devices.

In each of the above embodiments, the stand-by redundancy scheme that is one form of the dynamic redundancy scheme is applied to the signaling controllers 51-1 and 51-2. However, as long as reconfiguration is reliably performed under the control of the signaling/path processors 32-1 (or 32A-1) and 32-2 (or 32A-2), any of the following redundancy schemes may be applied to the signaling controllers 51-1 and 51-2 and any of other schemes such as the N+1 stand-by scheme may be applied thereto instead of duplication:

The active redundancy scheme that is another form of the dynamic redundancy scheme.

A static redundancy scheme in which no changes are made in the connections to the exterior in updating of the system configuration.

In each of the above embodiments, no specific descriptions are made on the forms of functional distribution and load distribution that are actually realized by a distributed processing system.

However, the forms of functional distribution and load distribution are not characterizing features of the invention and may be any forms as long as desired distributed processing is performed in such a manner that different processors perform processing for functions relating to supervisory and control and reconfiguration and processing for other functions.

In each of the above embodiments, no specific descriptions have been made on detailed procedures of processing performed by individual sections to perform reconfiguration.

However, the procedures of such processing are not characterizing features of the invention and can be realized under application of various known technologies. Therefore, they are not described in this specification.

In each of the above embodiments, the invention is applied to the exchange that is configured as a distributed processing system and performs circuit switching.

However, the application range of the invention is not limited to such an exchange; the invention can be applied to not only exchanges that perform message switching or store-and-forward switching but also any equipments and systems as long as distributed processing is performed in the above-described manners.

In each of the above embodiments, descriptions have been made on the procedures of the processing that is performed to recognize state-of-devices in a unified manner during the course of reconfiguration that is performed in response to an event that occurs in a steady operating state.

However, not only can the invention be applied to such a steady operating state but also it can similarly be applied to the following cases:

A case where a system configuration is set as initialization processing at a start.

A case where a package (or a module) that has not been mounted or has been in an out-of-service state due to a preceding trouble is incorporated without interruption of the operation of the system.

The invention is not limited to the above embodiments and various modifications may be made without departing from the spirit and scope of the invention. Any improvement may be made in part or all of the components.

What is claimed is:

1. A distributed-processing equipment comprising:
   a singular or plurality of first processor(s) monitoring operating states of a plurality of devices having a redundant structure, and reconfiguring said devices in accordance with a result of said monitoring, a number of sad first processor(s) being less than or equal to the number of said devices;
   a singular or plurality of second processor(s) cooperating with said plurality of devices according to a predetermined procedure, a number of said second processor(s) being less than or equal to the number of said devices; and
   a first storage means in which an identifier of the first processor is registered in advance, the first processor performing said reconfiguration in said plurality of devices, respectively, wherein
      when an event occurs during the course of said cooperation which provokes reconfiguration to be performed in one of said plurality of devices, the second processors notify one of the first processors that is indicated by an identifier in the first storage means that is registered corresponding to the device in which said event has occurred.

2. The distributed-processing equipment according to claim 1, wherein said first storage means is configured as a shared variable of said singular or plurality of second processor(s).

3. The distributed-processing equipment according to claim 2, further comprising a communication link monitoring means monitoring operating states of respective communication links that are used for inter-processor communication between said singular or plurality of second processor(s) and said single or of first processor(s), wherein:
   said singular or plurality of second processor(s) judge(s) whether a communication link that is connected to a first processor that is notified of an event is normal, according to a result of said monitoring by the communication link monitoring means; and
   said singular or plurality of second processor(s) use(s) a replacement link if said result of the judgment is false.

4. The distributed-processing equipment according to claim 3, wherein
   a combination of said singular or plurality of first processor(s) or said singular or plurality of second processor(s) is configured to run a process to be executed by a single information processing equipment, the combination being
      a part of a set of the plurality of the first processors and a part or all of a set of the plurality of the second processors, or
      a part of a set of the plurality of the second processors and a part or all of a set of the plurality of the first processors.

5. The distributed-processing equipment according to claim 2, wherein
   a combination of said singular or plurality of first processor(s) or said singular or plurality of second processor(s) is configured to run a process to be executed by a single information processing equipment, the combination being
      a part of a set of the plurality of the first processors and a part or all of a set of the plurality of the second processors, or
      a part of a set of the plurality of the second processors and a part or all of a set of the plurality of the first processors.

6. The distributed-processing equipment according to claim 1, further comprising a communication link monitoring means monitoring operating states of respective communication links that are used for inter-processor communication between said singular or plurality of second processor(s) and said singular or plurality of first processor(s), wherein:
   said singular or plurality of second processor(s) judge(s) whether a communication link that is connected to a first processor that is notified of an event is normal, according to a result of said monitoring by the communication link monitoring means; and
   said singular or plurality of second processor(s) use(s) a replacement link if said result of the judgment is false.

7. The distributed-processing equipment according to claim 6, wherein
   a combination of said singular or plurality of first processor(s) or said singular or plurality of second processor(s) is configured to run a process to be executed by a single information processing equipment, the combination being
      a part of a set of the plurality of the first processors and a part or all of a set of the plurality of the second processors, or
      a pail of a set of the plurality of the second processors and a part or all of a set of the plurality of the first processors.

8. The distributed-processing equipment according to claim 1, wherein
   a combination of said singular or plurality of first processor(s) or said singular or plurality of second processor(s) is configured to run a process to be executed by a single information processing equipment, the combination being
      a part of a set of the plurality of the first processors and a part or all of a set of the plurality of the second processors, or
      a part of a set of the plurality of the second processors and a part or all of a set of the plurality of the first processors.

9. A distributed-processing equipment comprising:
   a singular or plurality of first processor(s) monitoring operating states of a plurality of devices having a redundant structure, and reconfiguring said plurality of devices in accordance with a result of said monitoring, a number of said first processor(s) being less than or equal to the number of said devices;
   a singular or plurality of second processor(s) cooperating with said plurality of devices according to a predetermined procedure, a number of said second processor(s) being less than or equal to the number of said devices; and
   a second storage means in which an identifier of the second processor(s) that cooperates with the respective said plurality of devices is registered in advance, wherein said singular or plurality of first processor(s) notify of a result of said reconfiguration, to one of the second processors that is indicated by an identifier that is registered in the second storage means and that is corresponding to a device that was a subject of said reconfiguration.

10. The distributed-processing equipment according to claim 9, wherein said second storage means is configured as a shared variable of said singular or plurality of first processor(s).

11. The distributed-processing equipment according to claim 10, further comprising a communication link monitoring means monitoring operating states of respective communication links that are used for inter-processor communication between said singular or plurality of first processor(s) and said singular or plurality of second processor(s), wherein:

said single or of first processor(s) judge whether a communication link that is connected to a second processor that is notified of a result of reconfiguration is normal according to a result of said monitoring by the communication link monitoring means, and;

said singular or plurality of second processor(s) use(s) a replacement link if said result of the judgment is false.

12. The distributed-processing equipment according to claim 11, wherein a combination of said singular or plurality of first processor(s) or said singular or plurality of second processor(s) is configured to run a process to be executed by a single information processing equipment, the combination being
a part of a set of the plurality of the first processors and a part or all of a set of the plurality of the second processors, or
a part of a set of the plurality of the second processors and a part or all of a set of the plurality of the first processors.

13. The distributed-processing equipment according to claim 10, wherein a combination of said singular or plurality of first processor(s) or said singular or plurality of second processor(s) is configured to run a process to be executed by a single information processing equipment, the combination being
a part of a set of the plurality of the first processors and a part or all of a set of the plurality of the second processors, or
a part of a set of the plurality of the second processors and apart or all of a set of the plurality of the first processors.

14. The distributed-processing equipment according to claim 9, further comprising a communication link monitoring means monitoring operating states of respective communication links that are used for inter-processor communication between said singular or plurality of first processor(s) and said singular or plurality of second processor(s), wherein:

said single or of first processor(s) judge whether a communication link that is connected to a second processor that is notified of a result of reconfiguration is normal according to a result of said monitoring by the communication link monitoring means, and;

said singular or plurality of second processor(s) use(s) a replacement link if said result of the judgment is false.

15. The distributed-processing equipment according to claim 14, wherein a combination of said singular or plurality of first processor(s) or said singular or plurality of second processor(s) is configured to run a process to be executed by a single information processing equipment, the combination being
a part of a set of the plurality of the first processors and a part or all of a set of the plurality of the second processors, or
a part of a set of the plurality of the second processors and a part or all of a set of the plurality of the first processors.

16. The distributed-processing equipment according to claim 9, wherein a combination of said singular or plurality of first processor(s) or said singular or plurality of second processor(s) is configured to run a process to be executed by a single information processing equipment, the combination being
a part of a set of the plurality of the first processors and a part or all of a set of the plurality of the second processors, or
a part of a set off the plurality of the second processors and a part or all of a set of the plurality of the first processors.

17. A distributed-processing equipment comprising:
a plurality of devices having a redundant structure;
a singular or plurality of first processor(s) monitoring operating states of said plurality of devices, and reconfiguring said plurality of devices in accordance with a result of said monitoring and a form of the redundant structure, a number of said first processor(s) being less than or equal to the number of said devices;
a singular or plurality of second processor(s) cooperating with said plurality of devices, the cooperation concerning functions of said plurality of devices other than performing said reconfiguration, a number of said second processor(s) being less than or equal to the number of said devices; and
a first storage means in which an identifier of a first processor is registered in advance the first processor performing said reconfiguration in said plurality of devices, respectively, wherein
when an event occurs during the course of said cooperation which provokes reconfiguration to be performed in one of said plurality of devices, the second processors notify one of the first processors that is indicated by an identifier in the first storage means that is registered corresponding to the device in which said event has occurred.

18. The distributed-processing equipment according to claim 17, wherein said first storage means is configured as a shared variable of said singular or plurality of second processor(s).

19. The distributed-processing equipment according to claim 18, further comprising a communication link monitoring means monitoring operating states of respective communication links that are used for inter-processor communication between said singular or plurality of second processor(s) and said singular or plurality of first processor(s), wherein:

said single or plurality of second processor(s)judge(s) whether a communication link that is connected to a first processor that is notified of an event is normal according to a result of said monitoring by the communication link monitoring means, and;

said singular or plurality of second processor(s) use(s) a replacement link that is given according to a result of the monitoring if said result of the judgment is false.

20. The distributed-processing equipment according to claim 19, wherein
a combination of said singular or plurality of first processor(s) or said singular or plurality of second processor(s) is configured to run a process or a set of processes to be executed by a single information processing equipment, the combination being
a part of a set of the plurality of the first processors and a part or all of a set of the plurality of the second processors, or
a part of a set of the plurality of the second processors and a part or all of a set of the plurality of the first processors.

21. The distributed-processing equipment according to claim 18, wherein a combination of said singular or plurality of first processor(s) or said singular or plurality of second processor(s) is configured to run a process or a set of processes to be executed by a single information processing equipment, the combination being
a part of a set of the plurality of the first processors and a part or all of a set of the plurality of the second processors, or
a part of a set of the plurality of the second processors and a part or all of a set of the plurality of the first processors.

22. The distributed-processing equipment according to claim 17, further comprising a communication link monitoring means monitoring operating states of respective communication links that are used for inter-processor communication between said singular or plurality of second processor(s) and said singular or plurality of first processor(s), wherein:
said singular or plurality of second processor(s) judge(s) whether a communication link that is connected to a first processor that is notified of an event is normal according to a result of said monitoring by the communication link monitoring means, and;
said singular or plurality of second processor(s) use(s) a replacement link that is given according to a result of the monitoring if said result of the judgment is false.

23. The distributed-processing equipment according to claim 22, wherein
a combination of said singular or plurality of first processor(s) or said singular or plurality of second processor(s) is configured to run a process or a set of processes to be executed by a single information processing equipment, the combination being
a part of a set of the plurality of the fast processors and a part or all of a set of the plurality of the second processors, or
a part of a set of the plurality of the second processors and a part or all of a set of the plurality of the first processors.

24. The distributed-processing equipment according to claim 17, wherein a combination of said singular or plurality of first processor(s) or said singular or plurality of second processor(s) is configured to run a process or a set of processes to be executed by a single information processing equipment, the combination being
a part of a set of the plurality of the first processors and a part or all of a set of the plurality of the second processors, or
a part of a set of the plurality of the second processors and a part or all of a set of the plurality of the first processors.

25. A distributed-processing equipment comprising:
a plurality of devices having a redundant structure;
a singular or plurality of first processor(s) monitoring operating states of the devices, and reconfiguring the devices in accordance with a result of said monitoring and a form of the redundant structure, a number of said first processor(s) being less than or equal to the number of said devices;
a singular or plurality of second processor(s) cooperating with said plurality of devices the cooperation concerning functions of said plurality of devices other than performing said reconfiguration, a number of said second processor(s) being less than or equal to the number of said devices; and
a second storage means in which identifiers of a part of a set of the second processors is registered in advance, the second processors cooperating with the devices respectively,
wherein the first processors notify a result of said reconfiguration, to one of the second processors indicated by an identifier that is registered in the second storage means and that is corresponding to a device that was a subject of reconfiguration.

26. The distributed-processing equipment according to claim 25, wherein said second storage means is configured as a shared variable of said singular or plurality of first processor(s).

27. The distributed-processing equipment according to claim 26, further comprising communication link monitoring means monitoring operating states of respective communication links that are used for inter-processor communication between said singular or plurality of first processor(s) and singular or plurality of second processor(s), wherein:
said singular or plurality of first processor(s)judge(s) whether a communication link that is connected to a second processor that is notified of a result of reconfiguration is normal according to a result of said monitoring by the communication link monitoring means, and,
said singular or plurality of second processor(s) use(s) a replacement link that is given according to a result of the monitoring if said result of the judgment is false.

28. The distributed-processing equipment according to claim 27, wherein
a combination of said singular or plurality of first processor(s) or said singular or plurality of second processor(s) is configured to run a process or a set of processes to be executed by a single information processing equipment, the combination being
a part of a set of the plurality of the first processors and a part or all of a set of the plurality of the second processors, or
a part of a set of the plurality of the second processors and a part or all of a set of the plurality of the first processors.

29. The distributed-processing equipment according to claim 26, wherein
a combination of said singular or plurality of first processor(s) or said singular or plurality of second processor(s) is configured to run a process or a set of processes to be executed by a single information processing equipment, the combination being
a part of a set of the plurality of the first processors and a part or all of a set of the plurality of the second processors, or
a part of a set of the plurality of the second processors and a part or all of a set of the plurality of the first processors.

30. The distributed-processing equipment according to claim 25, further comprising communication link monitoring means monitoring operating states of respective communication links that are used for inter-processor communication between said singular or plurality of first processor(s) and singular or plurality of second processor(s), wherein:

said singular or plurality of first processor(s)judge(s) whether a communication link that is connected to a second processor that is notified of a result of reconfiguration is normal according to a result of said monitoring by the communication link monitoring means, and;

said singular or plurality of second processor(s) use(s) a replacement link that is given according to a result of the monitoring if said result of the judgment is false.

31. The distributed-processing equipment according to claim 30, wherein a combination of said singular or plurality of first processor(s) or said singular or plurality of second processor(s) is configured to run a process or a set of processes to be executed by a single information processing equipment, the combination being a part of a set of the plurality of the first processors and a part or all of a set of the plurality of the second processors, or a part of a set of the plurality of the second processors and apart or all of a set of the plurality of the first processors.

32. The distributed-processing equipment according to claim 25, wherein a combination of said singular or plurality of first processor(s) or said singular or plurality of second processor(s) is configured to run a process or a set of processes to be executed by a single information processing equipment, the combination being a part of a set of the plurality of the first processors and a part or all of a set of the plurality of the second processors, or a part of a set of the plurality of the second processors and a part or all of a set of the plurality of the first processors.

* * * * *